United States Patent [19]

Scott et al.

[11] 3,925,560

[45] Dec. 9, 1975

[54] FEED SUPPLEMENTS FOR RUMINANTS COMPRISING LIPID ENCAPSULATED WITH PROTEIN-ALDEHYDE REACTION PRODUCT

[75] Inventors: Trevor William Scott, Kellyville; Geoffrey Dean Loftus Hills, Beaumaris, both of Australia

[73] Assignee: Commonwealth Scientific and Industrial Research Organization, Australia

[22] Filed: May 14, 1973

[21] Appl. No.: 359,793

[52] U.S. Cl. ............ 426/2; 426/93; 426/98; 426/601; 426/656; 426/807
[51] Int. Cl.² .......................................... A23K 1/18
[58] Field of Search ......... 426/2, 807, 212, 364, 98, 426/388, 601, 656, 93; 200/123.5; 252/316

[56] References Cited
UNITED STATES PATENTS

| | | | |
|---|---|---|---|
| 2,800,457 | 7/1957 | Green et al. | 252/316 |
| 2,841,496 | 7/1958 | Brockman | 99/2 F |
| 3,043,782 | 7/1962 | Jensen | 252/316 |
| 3,265,629 | 8/1966 | Jensen | 99/2 ND |
| 3,265,630 | 8/1966 | Jensen | 252/316 |
| 3,507,662 | 4/1970 | Leroy et al. | 99/2 N |
| 3,533,958 | 10/1970 | Yurkowitz | 99/166 |
| 3,539,465 | 11/1970 | Hiestand et al. | 252/316 |
| 3,541,204 | 11/1970 | Sibbald et al. | 99/166 |
| 3,619,200 | 11/1971 | Ferguson | 99/2 ND |

OTHER PUBLICATIONS

Morrison, *Feeds and Feeding,* 1957, pp. 1050–1065.

*Primary Examiner*—Norman Yudkoff
*Assistant Examiner*—Curtis P. Ribando
*Attorney, Agent, or Firm*—Richards, Harris & Medlock

[57] ABSTRACT

A method for improving the utilization of lipid materials by ruminants comprising feeding ruminants an emulsion or emulsion product comprising homogeneous lipid bodies dispersed within a medium. The medium comprises the reaction product of a dietary protein and an aldehyde, said reaction product being substantially insoluble at a pH greater than about 5 and substantially soluble at a pH less than about 4. The lipid bodies disclosed are protected from degradation in the rumen but remain available for digestion in the abomasum or lower gut. Methods for preparing the emulsified product and ruminant milk and meat product produced with the aid of the emulsified products are also discussed herein.

11 Claims, 4 Drawing Figures

| UNSATURATED FATTY ACID | PARTICLE TREATMENT |
|---|---|
| LINOLEIC ACID | FORMALDEHYDE |
| LINOLEIC ACID | UNTREATED |
| LINOLENIC ACID | FORMALDEHYDE |
| LINOLENIC ACID | UNTREATED |

FIG. 3

FEED SUPPLEMENTS FOR RUMINANTS COMPRISING LIPID ENCAPSULATED WITH PROTEIN-ALDEHYDE REACTION PRODUCT

This invention is concerned with ruminant feed supplements having nutritional, therapeutic of prophylactic properties, and it relates to the production, composition, form and use of such supplements. More particularly, the invention seeks to provide high-energy, lipid-containing, feed supplements for ruminant animals which will permit major modifications of the animal's nutrition, fat and meat production without digestive disturbance. Another particular purpose of the invention is to provide a vehicle for the administration of lipid-soluble therapeutic and prophylactic substances to ruminants.

Dietary control of the nutrition of monogastric animals such as pigs and poultry has reached a highly advanced state with the use of high-energy and high-protein feeds containing supplemental hormones and medicaments. But this situation does not exist with ruminant animals such as cattle and sheep, largely because of their more complex and radically different digestive systems. It is known, for example, that the rumen micro-organisms break down proteins and modify lipid materials to such a degree that a high protein or a high energy diet is utilised most inefficiently by the ruminant. In our U.S. Pat. No. 3,619,200, it was shown that a high protein diet could be utilised efficiently for wool or meat production, if the protein was protected from breakdown within the rumen. This invention, on the other hand, is based upon the discovery that very substantial and useful improvements in the utilisation of high energy lipid diets by ruminants can also be achieved by protecting lipids from the action of rumen micro-organisms.

While it is known that the hydrogenation of unsaturated pasture lipids by the rumen microflora is a major factor in accounting for the characteristically saturated body and milk fats of the ruminant, attempts to attain substantial modification of fat production and composition by the feeding of large quantities of vegetable oils have not been successful in practice because of the poor efficiency of conversion which is partly due to the action of the rumen microflora and partly to the disturbance of normal digestion and the associated loss of appetite. Nevertheless, from the standpoint of human health and nutrition, there is an increasing demand and need for food products having a fat component with a high ratio of polyunsaturated fatty acids to saturated fatty acids (hereinafter termed the P/S ratio). By use of the feed supplements disclosed in this specification, it is now possible to radically increase this ratio in the ruminant body and milk fats without digestive disturbance to the animal and with substantial increases in efficiency of feed utilisation.

Broadly, the feed supplement of this invention comprises a lipid material which is finely divided into discrete particles or globules by product reaction p of a protein and an aldehyde which surrounds the particles or globules, the protein-aldehyde reaction product being substantially insoluble at pH greater than 5 but substantially soluble at pH less than 4. This supplement may be in the form of a finely divided particulate solid, where the particles have diameters of 0.01 to 5mm, preferably 0.2–2 mm., or it may be prepared and administered as a liquid emulsion. In either case the oil globules should have an average diameter substantially less than one tenth of a millimetre and most preferably of the order of a micron.

If it is desired to increase the proportion of polyunsaturated fatty acids in the animal's body and/or milk fats, unsaturated vegetable or animal fats or oils should be employed. Vegetable oils derived from for example, soya beans, peanuts, sunflowers, safflowers, cotton seeds, maize, rape, etc., or animal fats or oils derived from non-ruminants such as fish, fowls and pigs (or from ruminants which have been fed with the supplements of this invention) may be used.. If it is desired to administer hormones, vitamins, or other medicaments and modifying agents, these should be in lipid-soluble form and incorporated into the lipid component of the feed supplement, though this component need not be unsaturated for the purpose. (The term "other modifying agents" is intended to include flavouring, antioxidant, texturising and the like substances employed for their respective effects upon the meat, fat or milk products of the ruminant).

A wide variety of protein materials may be used, and their choice will depend upon their cost and emulsifying properties. However, it is preferable to ensure that this is digestible. For example, animal proteins such as casein, gelatine, or others obtainable from fish or meatmeals, and plant proteins, such as gluten or those present in the oil seeds themselves, are suitable. Such proteinaceous material is normally available in digestible form; that is, in a form such that it is susceptible to attack by the gastric juices of the ruminant abomasum, duodenum or intestine.

It is within the scope of this invention to derive the lipid and portein materials from the same single source, in this case usually an oil seed, such as safflower. It is not necessary to separate the protein and lipid materials and the finely divided source material, e.g. ground safflower may be emulsified and treated directly with the aldehyde.

The treatment with the aldehyde is, of course, intended to be sufficient to provide protection from the rumen microflora without being so great that digestibility of the proteinaceous material is significantly impaired. The amount of aldehyde chosen; generally between 1 and 6 percent of aldehyde by weight of the protein is sufficient to prevent metabolism of the lipid component of the particle. About 1½ to 2 percent of formaldehyde on casein is suitable, for example. Though other aldehydes than formaldehyde may be employed, formaldehyde appears to be the cheapest — and probably the most suitable — available; nevertheless, glutaraldehyde and glyoxal for example are possible.

Since, as disclosed in our above mentioned copending application, the aldehyde-protein complex is nutritionally available to the ruminant animal, the proportion of protein to lipid in the supplement of this invention is largely a matter of choice. However, in order to obtain adequate protection of the lipid material, at least 20 percent by weight of the particle should be protein. Ratios of lipid to protein in the range 1:1 to 4:1 have been found to be convenient for modifying ruminant fats.

In accordance with the invention, the lipid feed supplement is preferably made by forming an emulsion of lipid and protein in aqueous solution by homogenisation, spray-drying (or otherwise processing) the emulsion to form a coated particulate solid and treating the emulsion or the spray-dried product with an aldehyde. (The formation of the emulsion ensures the fine subdivision of the lipid as preferred). However, it is also envisaged that essentially the same product can be made by combining the lipid and protein as separate components in any suitable encapsulation method known in the art, the protein being treated with the aldehyde either before or after the encapsulation process. In any event, it is important that the lipid material should be finely subdivided by the protein, since it is thought that the acceptability of the high lipid supplements is due to the small globules of oil and their intimate association with digestible, or semi-digestible, protein; the feeding of large quantities of unprotected lipids in bulk form by mouth, is likely to cause severe metabolic disturbances and loss of appetite. Thus, while it is known that some natural pastures contain as much as 5 percent lipids and that a maximum of twice to three times this quantity can be fed to ruminant animals without causing intolerable digestive disturbance, it is possible in accordance with this invention to feed up to ten times that amount without undue reaction and with effective utilisation.

In order to minimise breakdown of the lipid supplement in the rumen, the particles of supplement should preferably be less than 0.5mm in diameter and have a relative density less than unity, or at most not greater than 1.2. In this way, the supplement can quickly separate from other material in the rumen and be passed to the abomasum with the liquor. Control over density can be obtained conveniently by controlling the amount of air mixed into the homogenate when forming the emulsion; upon spray-drying or the like, this entrained air forms voids in the particles and may produce hollow spheres to some advantage.

Finally, it should be noted that this invention also embraces the new and modified ruminant meat and milk products produced by the consistent administration of the lipid supplements disclosed herein.

Having now broadly portrayed the nature of the present invention, particular embodiments and facets thereof will now be described by way of example and illustration only. In this description, reference will be made to the following figures.

The term P/S ratio, used to describe ruminant meat and milk products in the following examples, is an index of the proportion of polyunsaturated fatty acids relative to saturated fatty acids. That is:

$$\frac{\text{Total polyunsaturated fatty acid content}}{\text{Total saturated fatty acid content}} = P/S \text{ ratio}$$

In the case of milk fat, for example, polyunsaturated fatty acids would include linoleic acid (di-unsaturated) and linolenic acid (tri-unsaturated), but not oleic acid (mono-unsaturated); saturated fatty acids would include stearic acid but, again, not oleic acid. Iodine values have not been quoted, except for butter in Table 2, as these are a measure of total unsaturation without indication of whether or in what proportion the unsaturation derives from mono- or polyunsaturated components.

Figure 1:
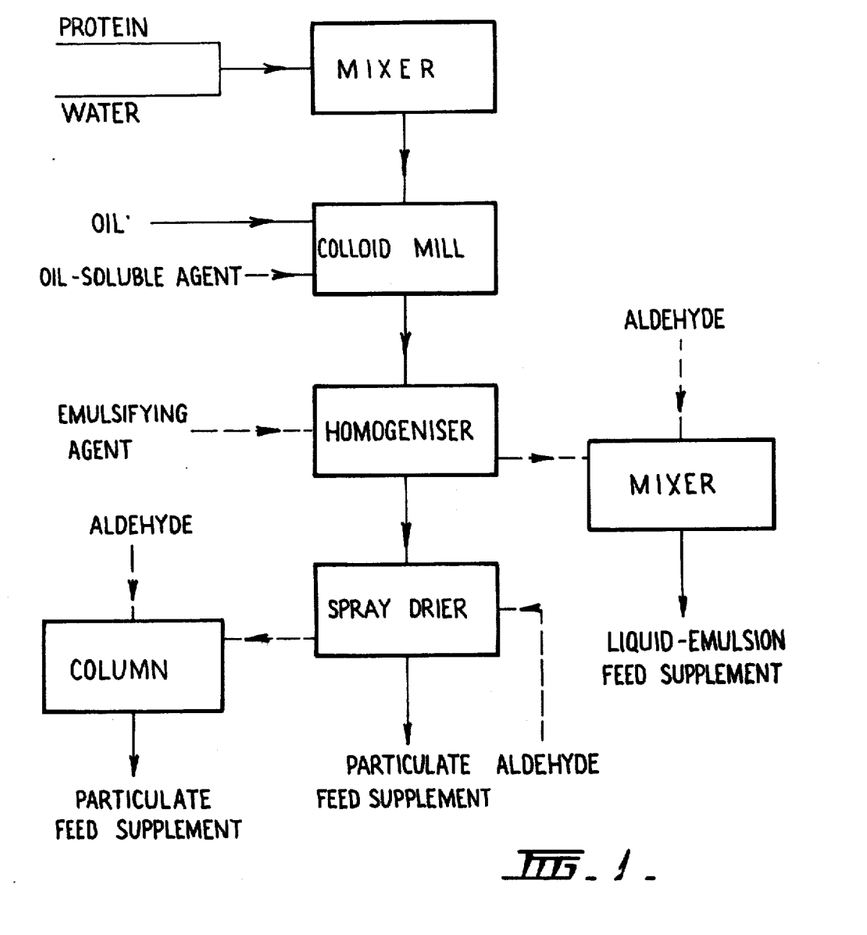
FIG. 1 is a flow chart illustrating some processes by which feed supplements of this invention are produced in the Examples.

Referring more particularly to FIG. 1, the illustrative feed supplements may be prepared by forming an aqueous solution of the protein component in a mixer, elevated temperature (for example 50°–80°C) and neutral or slightly alkaline pH conditions being employed to facilitate dissolution. The protein/water phase and an oil component are combined in a colloid mill and emulsification completed by passage through a homogeniser. Emulsification can be facilitated by the presence of an emulsifying agent such as lecithin. Also, should it be desired to incorporate lipid-soluble substances into the feed supplement, these may conveniently be introduced to the mixture with the oil component. If the feed supplement is required in liquid emulsion form, the product of the homogeniser needs no further processing beyond mixing with an appropriate amount of aldehyde. Otherwise (and this has been found preferable), the emulsion is pumped (after pre-heating if desired) into a spray-drier; typically, a water content in the emulsion of 60 to 80 percent, a pretreat temperature of 50°–90°C and a spray-drier air temperature of 160°–180°C may be employed. As shown in FIG. 1 by broken arrows, the aldehyde can be added in the spray-drier or (this has been found to be preferable) the spray-dried particles may be treated with the aldehyde in a separate stage. This is done by allowing the particles to pass down a column containing an atmosphere comprising the aldehyde. It is also possible to introduce the aldehyde during emulsification, or into the emulsion before spray drying, but as the aldehyde-treated emulsion tends to form a gel on standing (usually after about 20 minutes) delay between emulsification and spray drying should be avoided; alternatively the gel can be dried and ground to desired particle size.

For quality-control purposes, in vitro assessment of the product is important, and this may be done most simply by employing separate buffered aqueous solutions at pH6 and pH3 and at 30°–40°C. No more than a small percentage of the oil should be released after 15–20 hours at pH6 while a large percentage should be released at pH3 after 1½ to 2 hours. Greater reliability will be furnished, of course, by the use of simulated or aspirated rumen contents in place of the buffered solution.

Examples of particular products will now be given.

EXAMPLE 1

Acid precipitated casein (30 percent by weight) was dissolved in water, using a colloid mill as the mixer and with sufficient addition of NaOH to bring the pH to approximately 6.8. Safflower oil (to give a 1:1 lipid/protein ratio) and a dodecyl gallate emulsifying agent (0.1 percent by weight of oil) were mixed with the casein solution by a second passage through the colloid mill and emulsification completed in a two-stage homogeniser allowing air-entrainment. After heating to about 70°C the emulsion was spray dried to form particles which were then sprayed down the inside of a column through a fine mist of formalin; the input of formalin was controlled to supply formaldehyde at the rate of 4–5 percent (on a protein basis), the product being collected from the base of the column. A second feed supplement was prepared in the same way using linseed oil instead of safflower oil.

The feed supplement particles produced in this way are hollow spheres (10–60 $\mu$ in diameter) the shell of which comprises a matrix of casein crosslinked with formaldehyde which completely encases discrete globules (0.1–4.0 $\mu$ in diameter) of safflower oil or linseed oil.

Figure 2:
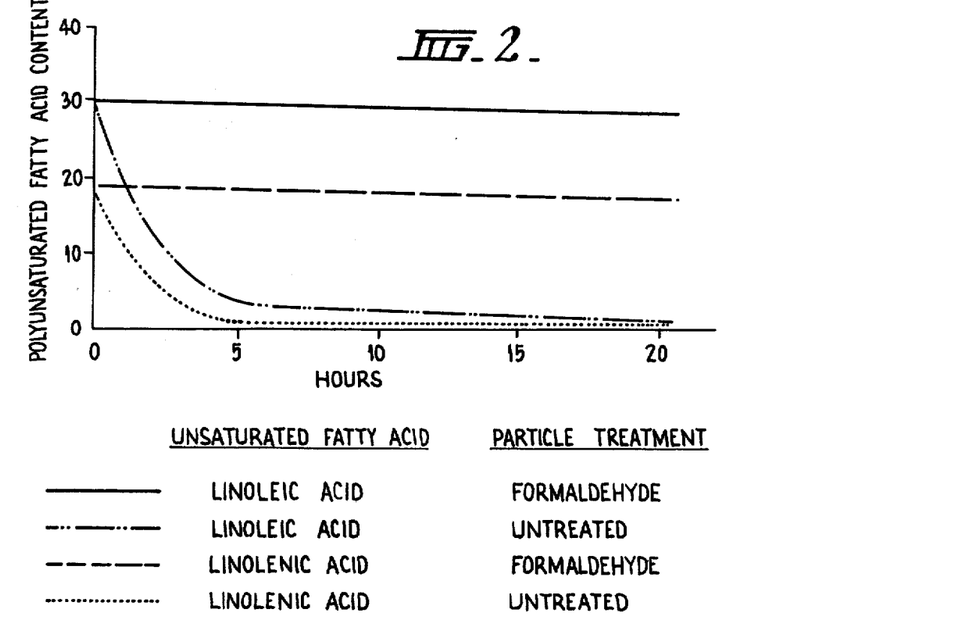
FIG. 2 is a graph comparing the in vitro resistance of the supplement of Example 1 with similar untreated feed supplement particles, to rumen contents.

As an in vitro test, samples of the products were incubated anaerobically at 38°C with strained rumen fluid obtained from a sheep which had been fasted for at least 12 hours. The degree of hydrogenation of the polyunsaturated acids was determined by comparing the proportion of these acids present in the mixtures before and after incubation; separate incubations were carried out to provide samples for analysis at several time periods up to 20 hours from start of incubation. Control incubations using non-formaldehyde treated particles, were carried out to assess the hydrogenating capacity of the rumen fluid. The results of these tests are given in FIG. 2 which illustrates that in particles which would otherwise suffer substantially complete hydrogenation of polyunsaturated fatty acid content within about 5 hours the polyunsaturated fatty acids are not significantly hydrogenated after 20 hours when the particles have been treated with formaldehyde.

Figure 3:
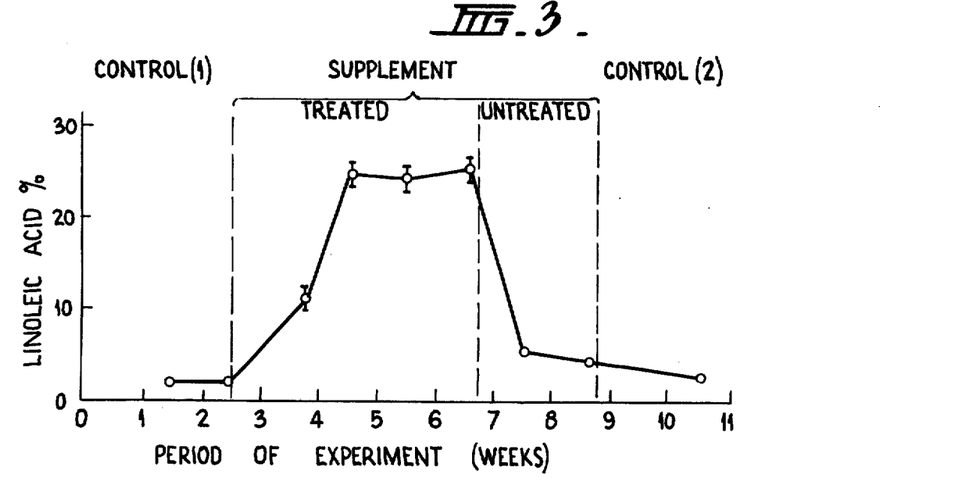
FIG. 3 is a graph showing the effect on the linoleic acid content of milk fat produced by feeding cows the supplement of Example 1.

FIG. 3 shows that the linoleic acid content of cow's milk can be raised from about 2 to about 25 percent when the animals are fed the safflower supplement. After the control period the cows were fed the supplement at the rate of 500gm/day (as 5 percent of a basal diet of lucerne and oats) for 1 week and thereafter until 6½ weeks at 1000gms/day (10 percent of basal diet). When the supplement was replaced by non-formaldehyde particles after 6½ weeks the linoleic acid content of the milk fat declined to about 5 percent within 1 week.

More dramatic results are obtained by feeding the supplement at higher rates, for example, when fed the feed supplement of Example 1 at a higher level of 15–20 percent of the basal diet the linoleic acid content of the milk fat of cows and goats was observed to rise to 35–38 percent within 48 hours from start of feeding. Not only is the polyunsaturated fatty acid content of milk fat increased by use of the feed supplements of the invention but also there is a significant increase in milk fat production. The following table shows how total milk fat production was increased by the order of 15–20 percent during a period of 4 weeks when cows were fed the supplement of Example 1 at the rate of 1000gms/cow/day.

TABLE 1

Effect of Feeding Safflower Oil-Casein Supplements on the Composition of Cows Milk

|  | Control Diet | Formaldehyde* Treated Supplement | Untreated** Supplement |
|---|---|---|---|
| Milk production (lb) | 23.1 | 22.6 | 21.0 |
| Fat (%) | 5.0 | 5.8 | 4.7 |
| Total fat (lb) | 1.1 | 1.3 | 1.0 |
| Protein (%) | 3.5 | 3.7 | 3.4 |

TABLE 1-continued

Effect of Feeding Safflower Oil-Casein Supplements on the Composition of Cows Milk

|  | Control Diet | Formaldehyde* Treated Supplement | Untreated** Supplement |
|---|---|---|---|
| Total Solids (%) | 14.8 | 15.2 | 14.1 |

*The formaldehyde treated supplement was fed for 4 weeks
**The untreated supplement was fed for 2 weeks.

4 Jersey X Zebu cows were fed the dietary supplements at the rate of 1000gm/cow/day. Milk samples were analysed twice weekly and the mean values are presented for all animals.

The increase in polyunsaturated fatty acid levels of milk from ruminants fed the protected supplements is, of course, evident in dairy products made from such milk, and in the following table a typical polyunsaturated butter is compared with an average Australian butter.

TABLE 2

Some Physical and Chemical Properties of Butter

|  | Poly-unsaturated | Average Australian |
|---|---|---|
| Linoleic acid (18:2) Content (%) | 33.2 | 1.5 |
| Softening point (°C) | 24.6 | 31–35 |
| Idoine value | 72 | 29–43 |

Apart from an approximately double unsaturated fatty acid content (see iodine value) it will be noted that the 30 percent decrease in softening point, which reflects the improved spreadability of polyunsaturated butter.

Figure 4:
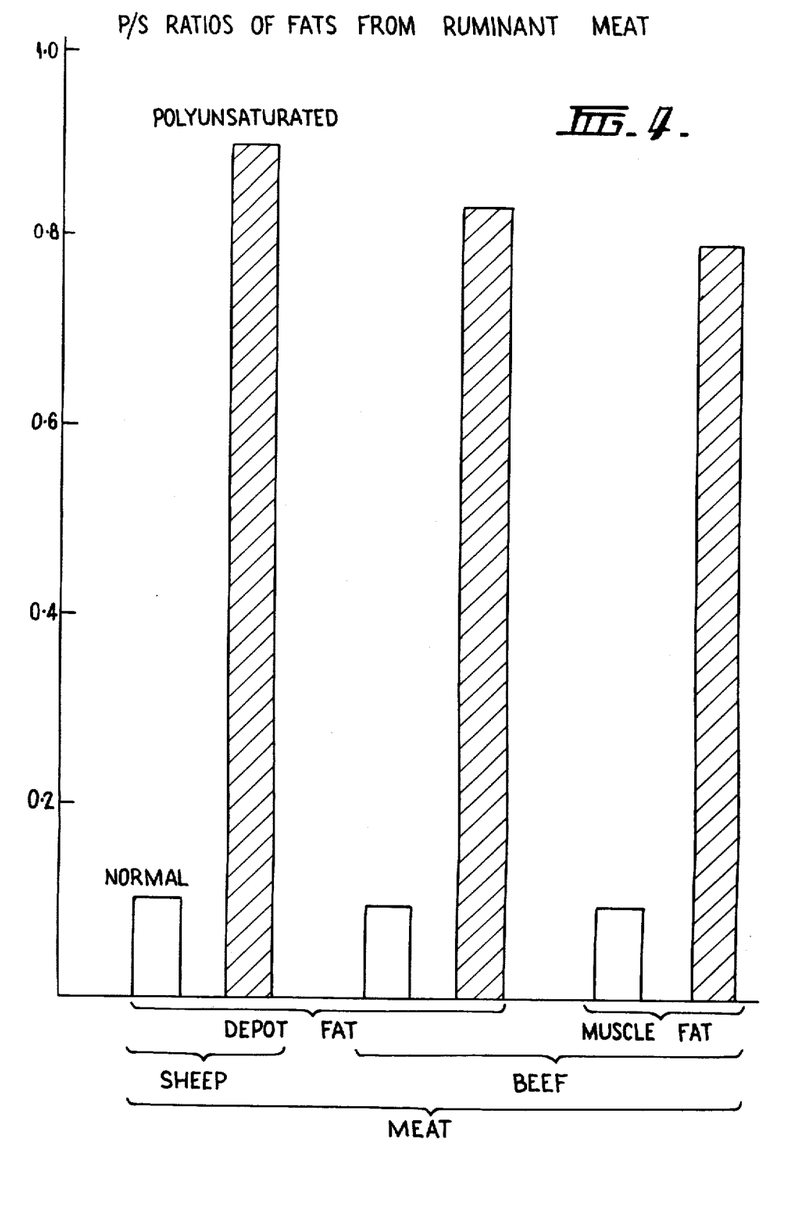
FIG. 4 is a bar diagram of polyunsaturated fat content of the body fat of sheep and cows fed the supplement of Example 1.

The remarkable increases in polyunsaturated fatty acid content of milk as described in the preceding examples is paralleled by increases in polyunsaturated fatty acid content of the body fat of ruminants fed the protected feed supplements. FIG. 4 shows how the P/S ratio of the body fat of lambs and beef steers was increased by about 800 percent after feeding a supplement as prepared in Example 1 for 4 weeks. The supplement was fed as 20 percent of a basal diet of lucerne and oats in the case of lambs and barley and lucerne in the case of the beef steers.

On assessment of the odour, flavour, tenderness, juiciness and colour of the meat products of these animals no significant difference from meat products of animals not fed the supplements were noted.

EXAMPLE 2

Safflower oil contains less than 1 percent of the tri-unsaturated fatty acid linolenic acid, and approximately 73 percent by weight of the di-unsaturated fatty acid linoleic acid. To demonstrate that the protected particles of this invention are effective in facilitating assimilation of tri- as of di-unsaturated fatty acids, a feed supplement was prepared according to Example 1, but using linseed oil (linoleic acid 19 percent, linolenic acid 50 percent) instead of safflower oil. As the following table shows, the linolenic acid content of goats milk can be increased from 1.5 percent to over 20 percent after 4 days feeding the supplement as 20 percent by weight of a basal diet of hay and oats.

TABLE 3

The Effects of Feeding Formaldehyde Treated Linseed Oil-Casein (1:1 w/w)
Particles on the Fatty Acid Composition of Goats Milk

| Fatty acid (percent by weight) | Control diet | | Diet plus formaldehyde treated supplement | |
|---|---|---|---|---|
| | Goat 1 | Goat 2 | Goat 1 | Goat 2 |
| 14:0 | 9.8 | 13.1 | 5.4 | 8.9 |
| 16:0 | 18.6 | 22.7 | 13.1 | 16.2 |
| 18:0 | 6.7 | 7.0 | 10.8 | 6..4 |
| 18:1 | 48.3 | 37.3 | 23.8 | 24.3 |
| 18:2 Linoleic acid) | 3.3 | 1.9 | 10.8 | 9.1 |
| 18:3 (Linolenic acid) | 1.5 | 1.4 | 24.7 | 20.9 |
| Others[a] | 11.8 | 16.6 | 11.4 | 14.2 |

Milk fatty acid compositions were determined prior to supplementation (Control diet) and after 4 days on the supplement rations.
[a]The control diet contained chopped lucerne hay and oats (1:1 w/w). Animals were fed once daily.

EXAMPLE 3

Although the supplements used in preceding examples have been prepared using lipids and proteins from separate sources, it is possible to prepare an effective protected lipid feed supplement using oil seed as starting material and without further addition of lipid or proteinaceous material.

A mixture of safflower oil seeds (30 percent by weight) in water, and with pH adjusted to 7–8 by addition of NaOH, was treated in a plate-grinder to reduce the solid matter to particle size less than 0.1mm. The mixture was then emulsified at 70°C by passage through a colloid mill in the presence of 0.1 percent by weight lecithin (as emulsifying agent). 2 percent by weight of formaldehyde (as formalin) was mixed with the emulsion and feed particles formed by spray drying in air at approximately 175°C.

When the thus prepared feed supplement was fed to lactating goats as 20 percent of a basal diet of hay and oats, the proportion of polyunsaturated fatty acids in the animals' milk was increased from 1–2 to 10–12 percent within 24 hours from start of feeding.

EXAMPLE 4

The incorporation of lipid soluble substances into the protected feed supplements presents no difficulties and tests have established the high effectiveness of such supplements as a means of introducing representative lipid soluble substances into the ruminants body.

Thus, a formaldehyde treated safflower oil/casein (1:1) supplement was prepared as described in Example 1; 0.025 percent by weight on a particle basis of dl-α-tocopherol (vitamin E) was mixed with the oil prior to homogenisation. When the supplement was tested in vitro according to Example 1 the tocopherol was not degraded and when fed to lactating cows as 15 percent of a basal diet of lucerne chaff and oats, the level of tocopherol in the ruminant milk fat was observed to increase by 20 percent over 48 hours.

EXAMPLE 5

It is not essential that the feed supplement be in solid particulate form; an effective liquid supplement is obtained by mixing a lipid-protein emulsion (prepared for instance as in Example 1) with formalin.

A liquid emulsion feed supplement obtained in this way, resulted in an increase in the polyunsaturated fatty acid content of the milk of lactating goats from 1–2 percent to 14–16 percent within 48 hours of the start of feeding the supplement as 20% of a basal diet of lucerne and hay.

EXAMPLE 6

Though formaldehyde is the preferred aldehyde for use in preparing the protected supplements, glutaraldehyde and glyoxal have been used. Supplements prepared according to Example 1 but using glutaraldehyde and glyoxal instead of formaldehyde displayed no significant degradation when tested in vitro as described in Example 1.

EXAMPLE 7

As previously indicated, the introduction of an aldehyde to a lipid-/protein emulsion tends to initiate gel formation, and it is possible to produce gels in a form suitable for drying by a variety of techniques, such as flash drying, tray drying, fluidisation or entrainment in hot gases, which are applicable to particulate solid or semi-solid materials.

Thus, in one case 20 kg/minute of whole safflower seeds were fed through a plate mill (gap setting 2mm) together with 30 kg/minute of water, and 2.5 kg/minute NaOH (2.5–3N) to yield a wet mash having about 38 percent solids and a pH between 10.5 and 11.5. This mash was pumped directly through a carbonundum stone mill (gap setting 0.1 mm) and fed to a blade mixer where 37 percent formalin was added at the level of about 1.5 percent by weight of protein. The stiff, paste-like product from the latter mixer was then fed to a flash drier, consisting of a bladed disc rotating in a current of hot air, to yield a dry powdery product which is entrained with air. Depending upon the characteristics of the protein component of the seed, it may be preferrable to add minor amounts of sodium caseinate or other soluble protein source, to facilitate emulsification and gel formation, high pH levels in the mash also being of assistance for this purpose. The use of a vibratory tray drier may have advantages in some products where agglomerated particles offer easier handling.

The flash-dried product described above was fed to lactating goats at the level of 30 percent by wt. of a basic diet of lucerne chaff and oats (1:1 w/w); the fatty acid content of the milk after three days feeding is shown in Table 4, together with the corresponding figures for milk from control animals fed the same, but unsupplemented diet.

Table 4

The effects of feeding safflower oil-seed (gel) supplements on the fatty acid composition of goats' milk

| Fatty Acid (% by wt.) | Control | Gel Supplement |
|---|---|---|
| 14:0 | 9.6 | 4.8 |
| 16:0 | 26.7 | 14.3 |
| 18:0 | 10.2 | 10.6 |

Table 4-continued

The effects of feeding safflower oil-seed (gel) supplements on the fatty acid composition of goats' milk

| Fatty Acid (% by wt.) | Control | Gel Supplement |
|---|---|---|
| 18:1 | 25.6 | 28.9 |
| 18:2 | 3.4 | 28.7 |
| 18:3 | 1.5 | 1.9 |

EXAMPLE 8

The high lipid diet made possible by the present invention constitutes a high energy feed of significant nutritional value for the animal and, therefore, offers a benefit which is independent of the degree of polyunsaturation of the lipid. Thus lipids which are fully saturated or nearly so, such as tallow, lard, palm oil and the like, can be employed where polyunsaturation is not a consideration.

A supplement having a 2:1 lipid:protein ratio was prepared as in Example 1, but using a mutton tallow (heated to 45°C to aid mixing and emulsification) instead of safflower oil. On feeding to two-month old steers as a supplement (10 percent by wt.) to a basic daily ration comprising 2000 g lucerne and 2000 g crushed oats, the animals were observed to have achieved a 10–20 percent better growth rate after three months than control animals on a similar diet which contained no supplement.

EXAMPLE 9

It has already been mentioned that the present invention has value for the protection of lipid soluble medicaments. Typically, the latter might be cortico-steriods or prostaglandins, which are essentially long chain fatty acids susceptible to breakdown in the rumen in a similar manner to previously mentioned lipids. It is known that such medicaments can stimulate appetite, fat deposition, oestrus and parturition when fed to monogastric animals and when injected into ruminants. From the following it will now be seen that this invention allows such medicaments to be fed effectively to ruminants.

Cortisone acetate was mixed with safflower oil to provide a concentration of 0.03 percent and the lipid-steroid solution was used to prepare a spray-dried and treated emulsion product as described in Example 1. This was fed to lactating cows at a rate equivalent to 30 mg/day of the cortico-steroid, while the unprotected steroid was fed at an equivalent rate to control animals. The peripheral plasma levels of the steroid in the experimental and control animals were found to average about 600 pico gm/ml and 120 pico gm/ml respectively.

During all the in vivo trials described above the animals were continually examined for any untoward effect which might have arisen from release of formaldehyde on digestion of the feed supplements. However, there were no indications whatsoever of toxic effects attributable to formaldehyde.

During all the feeding trials described, the animals were continually examined for the presence of digestive and other disturbances, but no untoward effects were observed. The tolerance of ruminants to the release of formaldehyde in the abomasum or rumen was checked in a number of independent trials. Though an upper safe limit to the amount of formaldehyde which can be fed with safety was not determined, no toxic effects were noted when sheep were fed (over a period of 3 months) an equivalent of 20 times the maximum amount of formaldehyde which would be consumed by feeding the treated supplement of Example 1 at 500 gms per day.

It will be seen from the above that the use of the lipid feed supplements described herein provides a technique for the management and control of ruminant growth, nutrition, and lipid production of considerable potential. By its use, it is possible for the first time to use high energy diets efficiently in ruminants; for the first time, radical control over the P/S ratio of ruminant body and milk fats can be obtained; control over natural flavour, texture and antioxidant properties of ruminant milk fat and meat products has now been made possible; and finally, a simple and effective way for the administration of lipid soluble therapeutic and prophylactic substances has been provided. However, it will be appreciated by those skilled in the art that many variations and modifications can be made to the particular examples and illustrations of the invention provided above without departing from the scope of the invention as defined by the following claims.

What we claim is:

1. In a method of feeding ruminant animals whereby a feed supplement comprises a nutritionally effective portion of the ruminants' diet, the improvement of providing dietary lipid to said ruminant animals in effective nutritional amounts thereby permitting modification of said ruminant animals nutrition, fat, meat and milk production without causing digestive disturbances by the method comprising:

feeding said ruminant animals a composite feed supplement material made of dietary lipid which is assimilable by ruminant animals and encapsulated by a reaction product of dietary protein and aldehyde which is substantially insoluble at a pH greater than about 5 and substantially soluble at a pH less than about 4 and therefore not degradable in the rumen but subject to degradation in the abomasum and lower gut, said dietary lipid consisting essentially of nutrient lipid globules of a size less than about 0.1 millimeter, said supplement being fed in a quantity which will supply said dietary lipid in said nutritional amounts for said ruminant animals; and allowing said supplement to be ingested by said ruminant animals and pass through the rumen and become digested in the abomasum and lower gut and thereby assimilated by said ruminant animals.

2. The improved method of claim 1 wherein said supplement has a lipid to protein ratio in the range of from about 1:1 to 4:1 and said feed supplement comprises from about 1 to about 6 percent aldehyde based on the weight of the protein therewithin.

3. The method of claim 2 wherein said aldehyde in said feed supplement is an aldehyde selected from glutaraldehyde, formaldehyde and glyoxal.

4. A method of increasing the unsaturated lipid content of body and milk fat of ruminant animals comprising:

feeding said ruminant animals a composite feed supplement material made of unsaturated dietary lipid which is assimilable by said ruminant animals and encapsulated by a reaction product of a dietary protein and an aldehyde which is substantially insoluble at a pH greater than about 5 and substantially soluble at a pH less than about 4 thereby not degradable in the rumen but subject to degradation in the abomasum and lower gut, said unsaturated dietary lipid encapsulated within said reaction product being in the form of discrete globules having a size less than about 0.1 millimeter; said supplement being fed in an effective amount to increase the unsaturated lipid content of body and milk fat of said ruminant animals; and allowing said supplement to be ingested by said ruminant animals and pass through the rumen and become digested in the abomasum and lower gut of said ruminant animals.

5. The method of claim 4 wherein said unsaturated dietary lipid is selected from animal oils derived from fish, fowl and pigs and vegetables oils derived from soybeans, peanuts, sunflowers, safflowers, cotton seed, maize and rape.

6. The method of claim 4 wherein said lipid comprises polyunsaturated lipid.

7. The method of claim 6 wherein said polyunsaturated lipid is at least one polyunsaturated vegetable oil.

8. The method of claim 7 wherein said protein and said lipid are derived from oil seed.

9. The method of claim 8 wherein said aldehyde is selected from formaldehyde, glutaraldehyde and glyoxal.

10. The method of claim 4 wherein said protein is selected from casein, gelatin and gluten.

11. The method of claim 10 wherein said aldehyde is selected from formaldehyde, glutaraldehyde and glyoxal.

* * * * *

PO-1050
(5/69)

UNITED STATES PATENT OFFICE
CERTIFICATE OF CORRECTION

Patent No. 3,925,560           Dated   December 9, 1975

Inventor(s)   Trevor William Scott, et al.

It is certified that error appears in the above-identified patent and that said Letters Patent are hereby corrected as shown below:

Col. 1, line 7, "of" should be --or--;
     line 60, "by product reaction p" should be --by the reaction product--.

Col. 2, line 12, "used..If" should be --used. If--;
     line 34, "portein" should be --protein--.

Col. 4, lines 58 and 59, "lipid/-protein" should be --lipid/protein--

Col. 6, line 29, "Idoine" should be --Iodine--.

Col. 7, line 9, "6..4" should be --6.4--;
     line 11, "Linoleic acid)" should be --(Linoleic acid)--;

line 53, "Lactatinc" should be --lactating--.

Signed and Sealed this twenty-ninth Day of June 1976

[SEAL]

Attest:

RUTH C. MASON
*Attesting Officer*

C. MARSHALL DANN
*Commissioner of Patents and Trademarks*